(12) United States Patent
Chen et al.

(10) Patent No.: US 11,216,649 B2
(45) Date of Patent: Jan. 4, 2022

(54) DISPLAY DEVICE CAPABLE OF AUTOMATICALLY ADJUSTING DISPLAYED IMAGE AND METHOD THEREOF

(71) Applicant: GIGA-BYTE TECHNOLOGY CO., LTD., New Taipei (TW)

(72) Inventors: Hung-Cheng Chen, New Taipei (TW); Tse-Hsine Liao, New Taipei (TW); Chin Hui Chen, New Taipei (TW); Chih-Hua Ke, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/853,103

(22) Filed: Apr. 20, 2020

(65) Prior Publication Data
US 2020/0356763 A1    Nov. 12, 2020

(30) Foreign Application Priority Data
May 10, 2019   (TW) .................................. 108116226

(51) Int. Cl.
*H04N 7/18* (2006.01)
*G06K 9/00* (2006.01)
(Continued)

(52) U.S. Cl.
CPC .......... *G06K 9/00288* (2013.01); *G06F 3/01* (2013.01); *G06K 9/00926* (2013.01); *H04N 5/247* (2013.01)

(58) Field of Classification Search
CPC .. G06K 9/00; G06K 9/00288; G06K 9/00926; G06F 3/01; H04N 5/247; H04N 7/18
(Continued)

(56) References Cited

U.S. PATENT DOCUMENTS 8,427,476 B2 * 4/2013 Chen ........................ G09G 3/20
                                                                345/428
9,880,635 B2   1/2018 Kramer et al.
(Continued)

FOREIGN PATENT DOCUMENTS

CN      102610035 A  *  4/2012  ........... G07F 19/207
CN      102610035 A     7/2012
(Continued)

OTHER PUBLICATIONS

TW Office Action in application No. 108116226 dated Apr. 27, 2020.
(Continued)

*Primary Examiner* — Trang U Tran
(74) *Attorney, Agent, or Firm* — Maschoff Brennan (57) ABSTRACT

A display device capable of automatically adjusting displayed image comprises a display device, a camera assembly, an image recognition device and a signal processor. The display device including a shell and a display panel partially exposed from the shell, wherein the display panel faces a first direction. The camera assembly obtains a first image with a first visual angle and obtain a second image with a second visual angle. The image recognition device generates a first instruction when the first image meets a first condition and generates a second instruction when the second image meets a second condition. The signal processor adjusts the display signal to conceal the displayed image according to the first instruction and to adjust the display signal to generate a reminder message on the displayed image according to the second instruction.

16 Claims, 8 Drawing Sheets

(51) Int. Cl.
*G06F 3/01* (2006.01)
*H04N 5/247* (2006.01)

(58) Field of Classification Search
USPC .......................................................... 348/143
See application file for complete search history.

(56) References Cited

U.S. PATENT DOCUMENTS

| | | | |
|---|---|---|---|
| 10,762,334 B2* | 9/2020 | Wang | G06K 9/00281 |
| 2013/0254874 A1 | 9/2013 | Xu | |
| 2013/0311896 A1 | 11/2013 | Singh et al. | |
| 2014/0201844 A1 | 7/2014 | Buck | |
| 2017/0041592 A1 | 2/2017 | Hwang et al. | |
| 2017/0332046 A1 | 11/2017 | Liu | |
| 2020/0293754 A1* | 9/2020 | Huang | G06K 9/00597 |

FOREIGN PATENT DOCUMENTS

| | | |
|---|---|---|
| JP | 2000-331209 A | 11/2000 |
| JP | 2010-122754 A | 6/2010 |
| JP | 2010-128778 A | 6/2010 |
| JP | 2011-243080 A | 12/2011 |
| KR | 10-2004-0031968 A | 4/2004 |
| TW | 201339987 A | 10/2013 |
| TW | I512537 B | 12/2015 |
| WO | 2018082217 A1 | 5/2018 |

OTHER PUBLICATIONS

EP Search Report in Application No. 20170607.4 dated Jul. 28, 2020.
Japanese Office Action issued in corresponding application No. JP 2020-082790, dated Apr. 13, 2021.
KR Office Action in Application No. 10-2020-0053958 dated Jun. 10, 2021.

* cited by examiner

DISPLAY DEVICE CAPABLE OF AUTOMATICALLY ADJUSTING DISPLAYED IMAGE AND METHOD THEREOF

CROSS-REFERENCE TO RELATED APPLICATIONS

This non-provisional application claims priority under 35 U.S.C. § 119(a) on Patent Application No(s). 108116226 filed in Taiwan, ROC on May 10, 2019, the entire contents of which are hereby incorporated by reference.

BACKGROUND

1. Technical Field

This disclosure relates to a display device and a method of adjusting displayed image, and more particularly to a display device capable of adjusting displayed image based on image recognition and method thereof.

2. Related Art

An open-type office is often visited by customers, manufacturers, or people other than employees. These people can easily peep or secretly capture confidential information displayed on the computer screen when they walk through the aisle. In the current market, an anti-peeping product uses a piece of privacy filter with a multilayer optical film or coating to achieve the effect of anti-peeping. This kind of product uses a method of changing the light reflection angle to allow users seated in the visual angle of the screen to see the content on the screen, and others outside the visual angle cannot see the content.

However, the privacy filter that achieves an anti-peeping effect through the optical principle brings the user a visual interference such as the reduction of screen brightness. It is impossible for the privacy filter to be completely transparent. Therefore, after the privacy filter is installed on the screen, even if the user is in the visual angle of the screen, the user may see a dark screen. In addition, the user may need to increase the brightness of the screen to display a clear content on the screen. This will not only cause extra power consumption, but also have an impact on the user's eye health.

For preventing the screen from being peeped, another way is to perform an image recognition according to the image obtained by the camera disposed on the monitor, and turns off the screen when detects certain conditions, for example, other faces existing in front of the screen, or a non-user sight directing to the screen. This way conceals the current displayed image when detecting aforementioned conditions.

However, face recognition or sight detection requires a certain amount of time for processing. Considering a person who suddenly get close to the computer screen, it is possible to immediately detect the suspicious person. Unfortunately, before the suspicious person is detected and then the screen is turned off, the suspicious person has already seen the confidential information for a certain time. In other words, the way described above still cannot overcome the problem of real-time determination when a suspicious person suddenly appears in the visual range of the screen.

SUMMARY

According to one or more embodiment of this disclosure, a display device capable of automatically adjusting displayed image comprising: a display device including a shell and a display panel partially exposed from the shell, wherein the display panel faces in a first direction and the display device is configured to show a displayed image on the display panel according to a display signal; a camera assembly disposed on the shell, wherein the camera assembly is configured to obtain a first image with a first visual angle and obtain a second image with a second visual angle, wherein the first direction is in a range of the first visual angle and is out of a range of the second visual angle; an image recognition device disposed in the shell and electrically connecting to the camera assembly, wherein the image recognition device is configured to generate a first instruction when the first image meets a first condition and to generate a second instruction when the second image meets a second condition, and the first instruction is different from the second instruction; and a signal processor electrically connecting to the display panel and the image recognition device, wherein the signal processor is configured to adjust the display signal to conceal the displayed image according to the first instruction and to adjust the display signal to generate a reminder message on the display panel according to the second instruction.

According to one or more embodiment of this disclosure, a method of automatically adjusting displayed image comprising: displaying a displayed image according to a display signal by a display device facing a first direction; after displaying the displayed image by the display device, obtaining a first image with a first visual angle and obtaining a second image with a second visual angle by a camera assembly, wherein the first direction is in a range of the first visual angle and is out of a range of the second visual angle; detecting the first image and the second image, sending a first instruction when the first image meets a first condition, and sending a second instruction when the second image meets a second condition by an image recognition device; and adjusting the display signal according to the first instruction by a signal processor to conceal the displayed image, or adjusting the display signal according to the second instruction to generate a reminder message on the displayed image.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
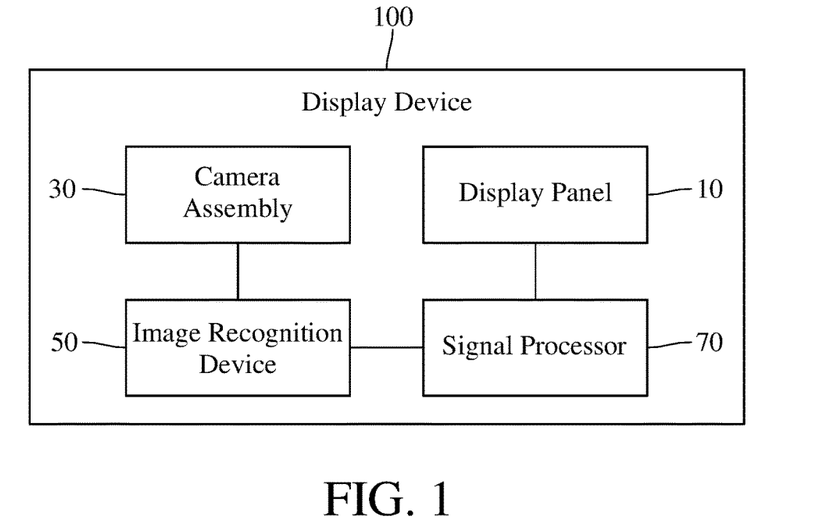
FIG. 1 is an architecture diagram of a display device capable of automatically adjusting displayed image according to an embodiment of the present disclosure.

Please refer to FIG. 1. FIG. 1 is an architecture diagram of a display device 100 capable of automatically adjusting displayed image according to an embodiment of the present disclosure. As shown in FIG. 1, the display device 100 includes a display panel 10, a camera assembly 30, an image recognition device 50, and a signal processor 70, wherein the display panel 10 electrically connects to the signal processor 70, and the image recognition device 50 electrically connects to the camera assembly 30 and the signal processor 70.

The display panel 10 shows a displayed image according to a display signal. The camera assembly 30 obtains a first image and a second image at least. The image recognition device 50 generates a first instruction when the first image meets a first condition and generates a second instruction when the second image meets a second condition, wherein the first instruction is different from the second instruction. The signal processor 70 adjusts the display signal to conceal the displayed image according to the first instruction and to adjust the display signal to generate a reminder message on the displayed image according to the second instruction.

Two examples of the camera assembly 30 of the display device 100 according to an embodiment of the present disclosure are illustrated in FIG. 2A, FIG. 2B, FIG. 3A and FIG. 3B.

Figure 2A:
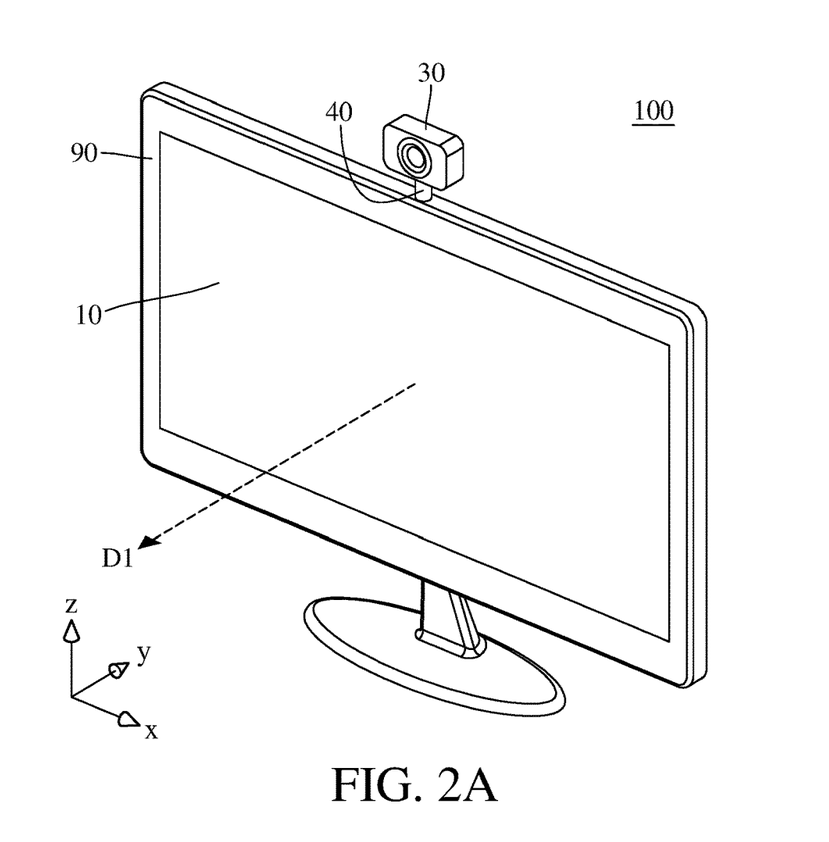
FIG. 2A illustrates a first example of a camera assembly disposed on the display device capable of automatically adjusting displayed image.

Please refer to FIG. 2A. The appearance of the display device 100 includes the display panel 10, the camera assembly 30, and further includes a shell 90. The display panel 10 is partially exposed from the shell 90. The display panel 10 faces in a first direction D1 and show a displayed image to the user. The camera assembly 30 is disposed on the shell 90 and the lens of the camera assembly 30 is partially exposed from the shell 90. The image recognition 50 and the signal processor 70 are disposed in the shell and are not illustrated in the FIG. 2A and FIG. 2B.

In the first example, the camera assembly 30 further includes a rotary mechanism 40 disposed outside the shell 90 as shown in FIG. 2A. Therefore, the camera assembly 30 can rotate about the Z-axis to obtain the image around the display device 100.

Figure 2B:
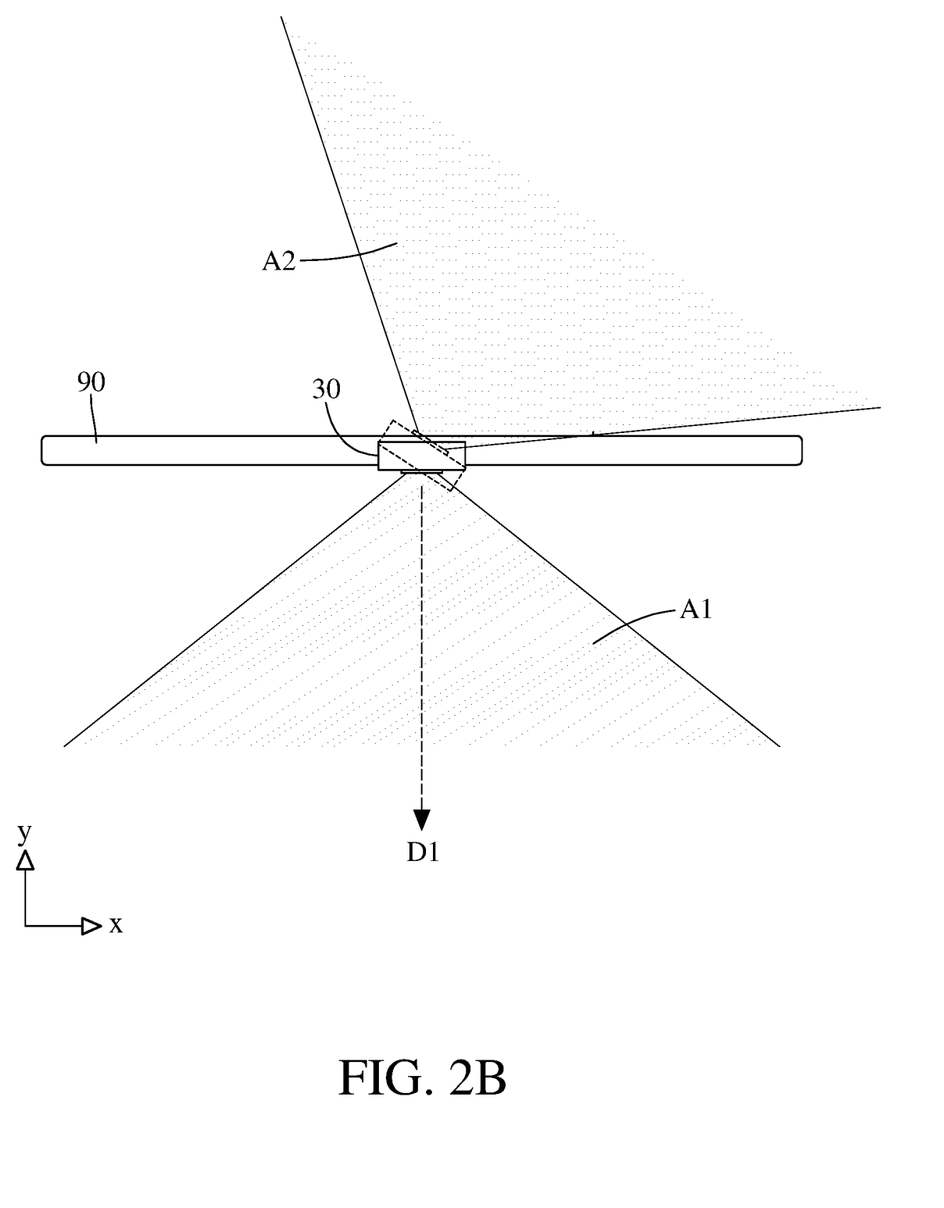
FIG. 2B is a top view of the display device capable of automatically adjusting displayed image according to an embodiment of the present disclosure.

Please refer to FIG. 2B. FIG. 2B is a top view of the display device 100. FIG. 2B shows a first visual angle A1 and a second visual angle A2 when the lens of the camera assembly 30 directs in two directions. The first direction D1 is in a range of the first visual angle A1 and is out of a range of the second visual angle A2.

Practically, the camera assembly 30 may include a wide-angle lens such as that with 180-degree angle of view. Therefore, the image obtained with the first visual angle A1 and the image obtained with the second visual angle A2 can cover a range of 360 degrees around the display device 100. However, the present disclosure does not limit ranges of the visual angle A1 and the visual angle A2. For example, if the angle of view of each lens is smaller than 180 degrees, the rotary mechanism 40 will be used to control the camera assembly 30 to shoot images in two or more directions for completely covering the 360-degree range around the display device 100.

Figure 3A:
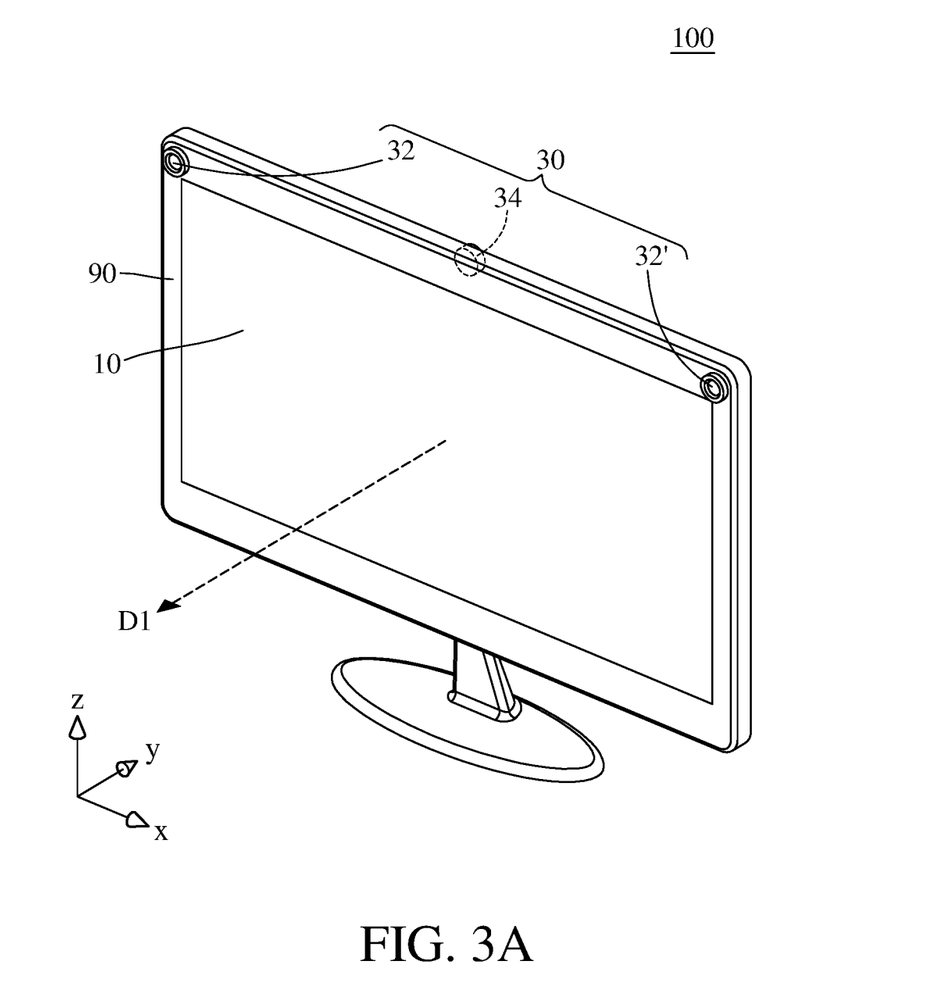
FIG. 3A illustrates a second example of the camera assembly of the display device capable of automatically adjusting displayed image.

Please refer to FIG. 3A. In the second example, the camera assembly 30 has multiple camera devices, such as first camera devices 32 and 32' which include two lenses in total, and a second camera device 34 with a single lens. The first camera devices 32 and 32' face in the first direction D1 and are disposed on the shell 90. The second camera device 34 is disposed on the shell 90 and the first direction D1 is not in the range of the angle of view of the second camera device 34.

Figure 3B:
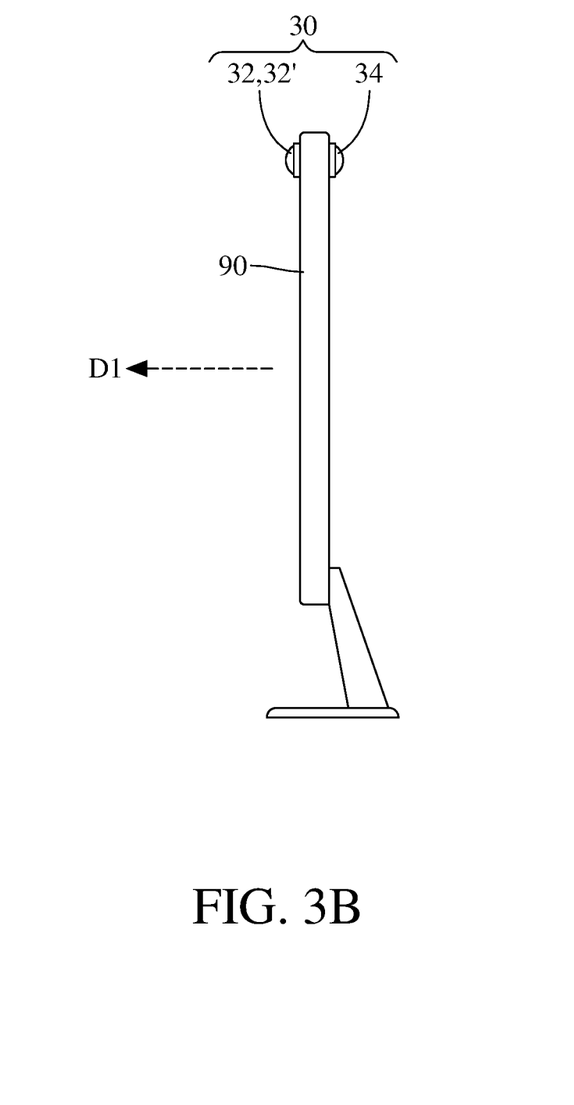
FIG. 3B illustrates a side view of the second example of the camera assembly of the display device capable of automatically adjusting displayed image.

FIG. 3B illustrates a side view of the second example of the camera assembly 30 according to the display device 100 shown in FIG. 3A. As shown in FIG. 3B, the first camera devices 32 and 32' and the second camera device 34 have different visual angles based on the display device 100. The present disclosure obtains a 360-degree panoramic image around the display device 100 by the camera assembly 30 composed of a single lens or multiple lenses. The present disclosure does not limit the number of the camera devices of the camera assembly 30. When the camera assembly 30 is able to obtain a 360-degree panoramic image, an anti-peeping function can be achieved by integrating the camera assembly 30 with the image recognition device 50 and the signal processor 70.

Figure 4:
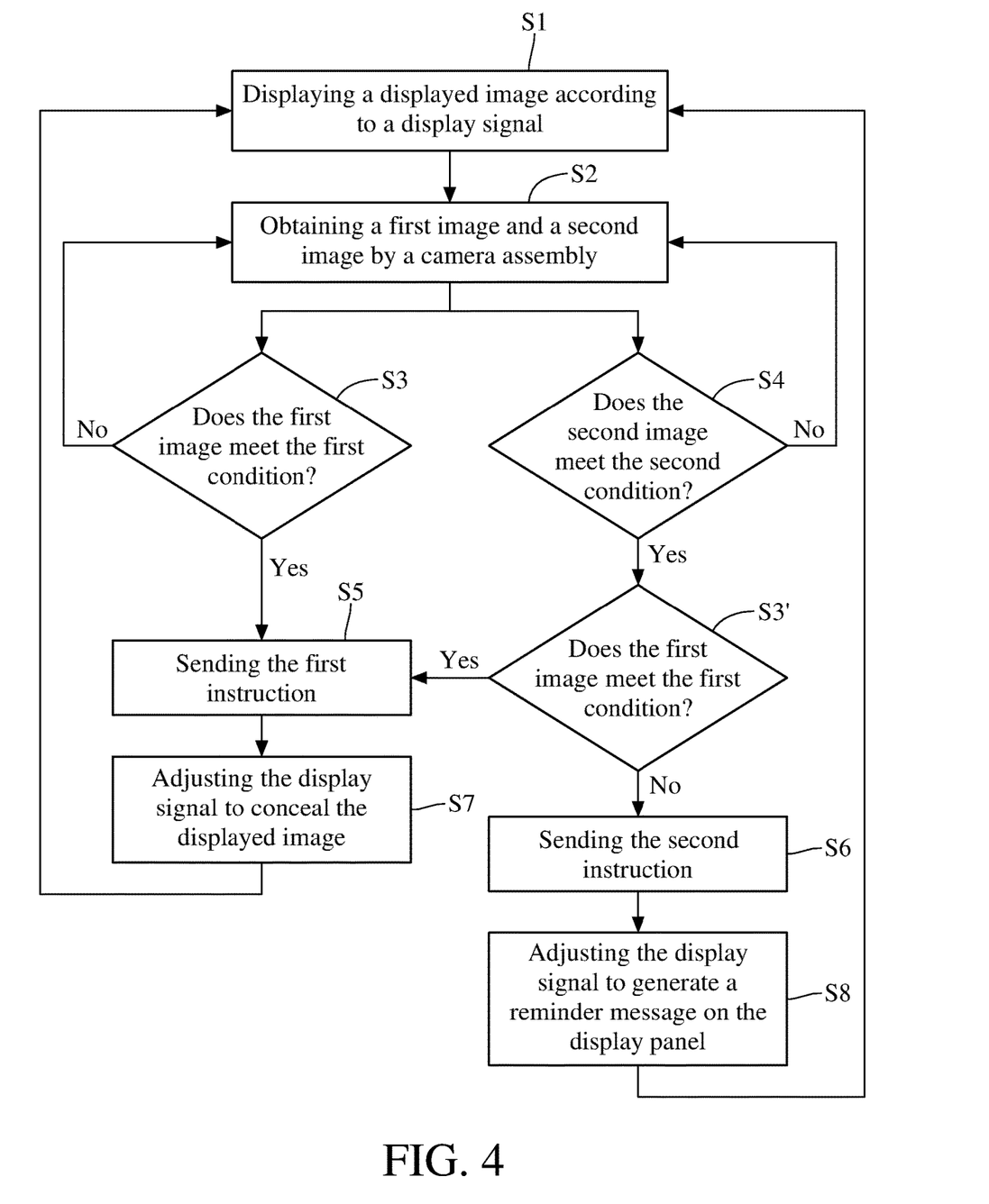
FIG. 4 is a flow chart of a method of automatically adjusting displayed image according to an embodiment of the present disclosure.

Please refer to FIG. 4. FIG. 4 is a flow chart of a method of automatically adjusting displayed image according to an embodiment of the present disclosure.

Please refer to step S1. The display device 100 faces in the first direction D1 to display a displayed image according to a display signal.

Please refer to step S2. After displaying the displayed image by the display device 100, the camera assembly 30 obtains a first image with a first visual angle A1 and obtains a second image with a second visual angle A2, wherein the first direction D1 is in a range of the first visual angle A1 and is out of a range of the second visual angle A2.

Please refer to step S3. The image recognition device 50 determines whether the first image meets a first condition. If the determination result is positive, step S5 will be performed next, namely the image recognition device 50 sends the first instruction. Step S7 is then performed, namely the signal processor 70 adjusts the display signal to conceal the displayed image according to the first instruction. For example, the signal processor 70 may change the brightness, the color, or the font size of the display device 100, generate a pop-out window in the displayed image, or show a specified image stored in the storage space on the displayed image. In addition, when receiving the first instruction, the signal processor 70 may send an instruction corresponding to the first instruction to a computer host connected to the display device 100, so that the system may perform a log-out operation or perform a window-switching operation. Step S1 is performed after step S7 is finished, and the display device 100 shows the displayed image according to the latest display signal.

Please refer to step S4. The image recognition device 50 determines whether the second image meets a second condition. If the determination result is positive, step S3' will be performed next, namely the image recognition device 50 determines whether the first image meets a first condition. If the determination result of step S3' is positive, step S5 is performed next. If the determination result of step S3' is negative, step S6 is performed next, namely the image recognition device 50 sends the second instruction, and step S8 is performed thereafter, namely the signal processor 70 adjusts the display signal to generate a reminder message on the display panel according to the second instruction.

Figure 5:
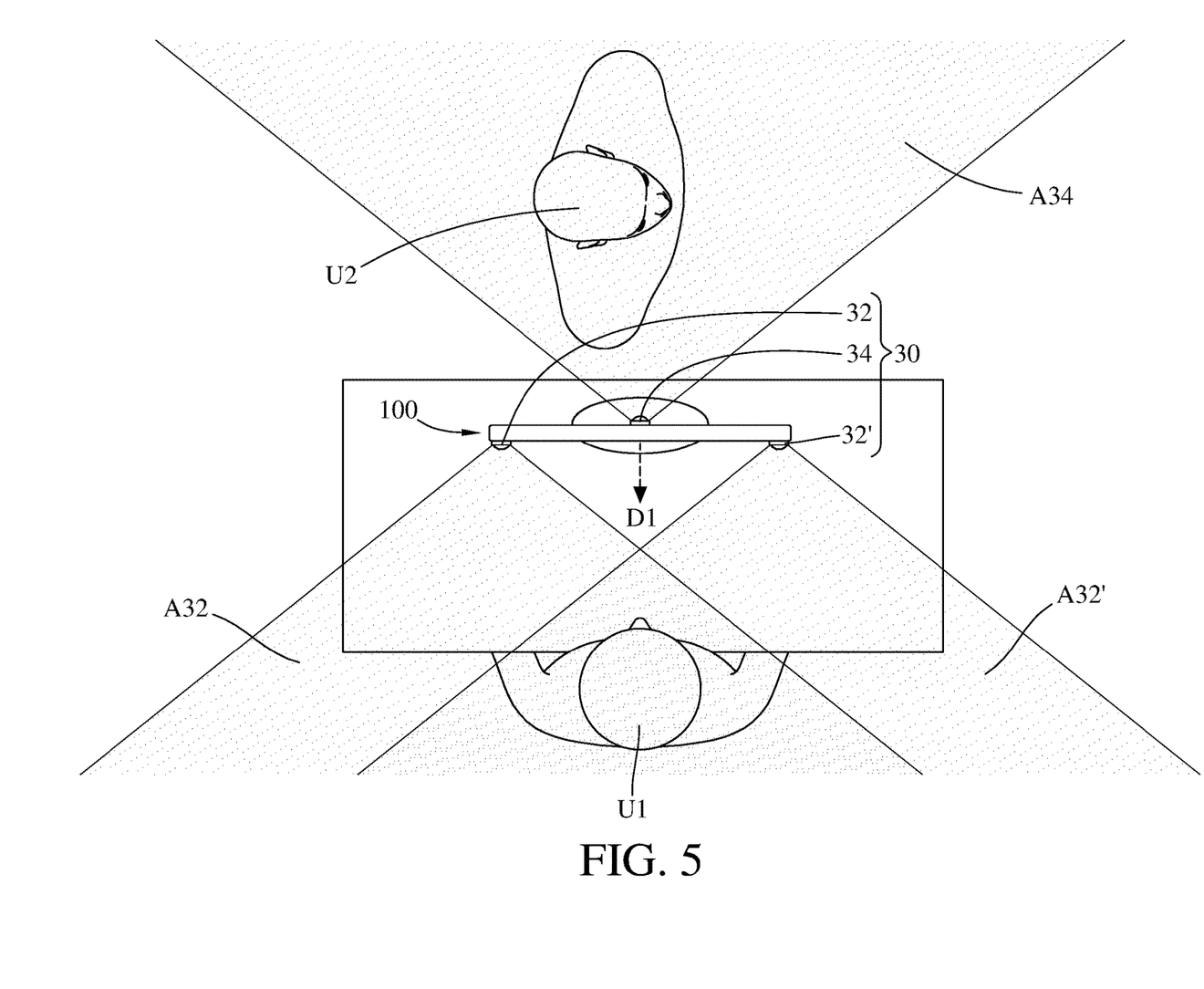
FIG. 5 is a schematic diagram of the first visual angle and the second visual angle according to the display device capable of automatically adjusting displayed image of an embodiment of the present disclosure.

The details of the first visual angle A1 and the second visual angle A2 mentioned in step S2 will be described below. Please refer to FIG. 5. FIG. 5 is a schematic diagram of the first visual angle A1 and the second visual angle A2 according to the display device 100 shown in FIG. 3A and FIG. 3B. The first camera devices 32 and 32' has two angles of view, A32 and A32'. The first visual angle is a combination of said two angles of view, A32 and A32'. In other words, using multiple camera devices to form a larger angle of view may solve the problem that a single camera device has smaller angle of view. The angle of view of the second camera device 34 may be served as the second visual angle A2. Practically, there may be a plurality of second camera devices 34 like the first camera devices 32 and 32' shown in FIG. 5. The present disclosure does not limit the number of lenses of the second camera 34. As shown in FIG. 5, the first direction D1 is in the range of the first visual angle A32 and A32' and is out of the range of the second visual angle A34. In FIG. 5, the user U1 is located in the first direction D1 of the display device 100, and the suspicious person U2 is located in the direction opposite to the first direction D1.

Figure 6A:
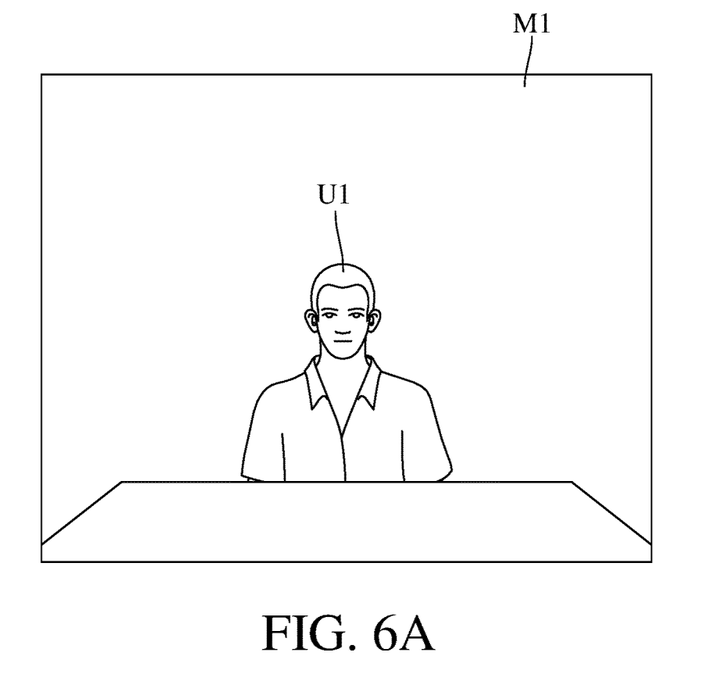
FIG. 6A is the first image according to the display device capable of automatically adjusting displayed image of an embodiment of the present disclosure.
Figure 6B:
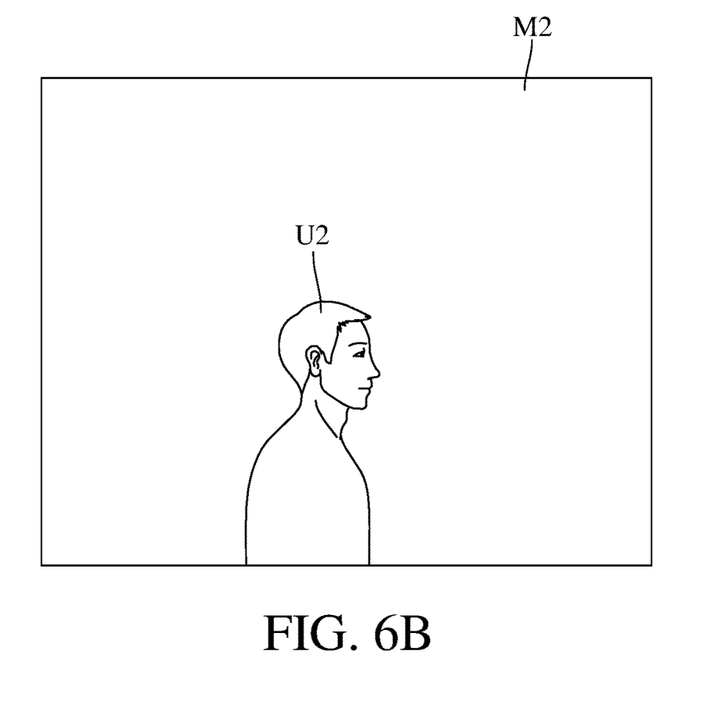
FIG. 6B is the second image according to the display device capable of automatically adjusting displayed image of an embodiment of the present disclosure.

Please refer to FIG. 6A and FIG. 6B. FIG. 6A shows the first image M1 obtained by the first camera devices 32 and 32', wherein the first image M1 includes the user U1. FIG. 6B shows the second image M2 obtained by the second camera device 34, wherein the second image M2 includes the suspicious person U2.

The first condition mentioned in step S3 and the second condition mentioned in step S4 will be described in detail below. In should be noted that the determination manner adapted to the first condition is also adapted to the second condition. In an embodiment of the present disclosure, the second condition is that the second image M2 has a human face.

In an embodiment of the present disclosure, the display device 100 capable of automatically adjusting displayed image further comprises a storage device configured to store a white list. The white list includes a plurality of valid face images. The first condition is that the first image M1 has a human face, and this human face does not belong to the plurality of valid face images of the white list. In an embodiment, the image recognition device 50 may calculate the characteristic value of the human face of the first image M1. In addition, the white list stores not only the valid face images but also pre-calculated characteristic values corresponding to these valid face images. For example, if the image recognition device 50 determines that the human face of the user U1 in the first image M1 does not match to any of the valid face images of the white list, the image recognition device 50 will generate a first instruction as shown in step S5 of FIG. 4. In an embodiment, the way to determine whether the first image M1 match to any of the valid face images of the whiter list is to calculate the difference between the characteristic value of human face portion of the first image M1 and each of the characteristic values of the valid face images of the white list. If the difference is smaller than a threshold, the determination result will be "match".

If the image recognition device 50 finds a record corresponding to the user U1 in the white list, the image recognition device 50 will send an instruction to unlock the screen so that the display device 10 will show the displayed image to the user. Moreover, the image recognition device 50 updates the characteristic value of the human face of the user U1 to (as a face image of the white list) the valid face images of the white list every time when the unlock operation is performed. The success rate of the unlock operation based on the white list may be improved by updating the characteristic values to the valid face images stored in the white list.

In another embodiment of the present disclosure, the display device 100 capable of automatically adjusting displayed image further comprises a storage device configured to store a black list. The black list includes a plurality of invalid face images. The first condition is that the first image M1 has a human face, and this human face belong to one of the invalid face images of the black list. For example, if the image recognition device 50 determines that the human face of the user U1 in the first image M1 do match to any of the invalid face images of the black list, the image recognition 50 will generate a first instruction as shown in step S5 of FIG. 4.

In addition to the face recognition described in the above two examples, the first instruction may be generated by a comparison between two first images M1 obtained in two timings. For example, the camera assembly 30 may obtain the first image M1 at a specified interval, and the first condition is that two contents of the two first images M1 obtained continuously are inconsistent.

Figure 7:
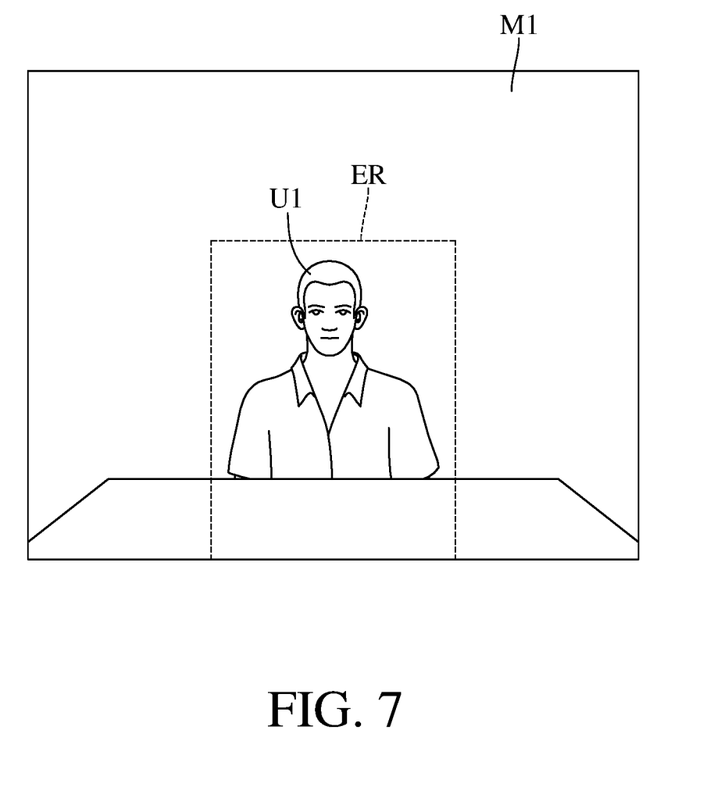
FIG. 7 is schematic diagram of an exception area of the first image according to the display device capable of automatically adjusting displayed image of an embodiment of the present disclosure.

Please refer to FIG. 7. In another embodiment of the present disclosure, the image recognition device 50 is further configured to set an exception area ER to the first image M1. In this embodiment, the first condition is that the two consecutive first images M1 obtained by the camera assembly 30 are inconsistent outside the exception area ER, or the first condition is that the first image M1 has a human face outside the exception area ER. For example, the user U1 may set an available area where he may appear in front of the display device 100 as the exception area ER. The image recognition device 50 generates the first instruction immediately when detecting any change of the image outside this available area. For another example, the image recognition device 50 generates the first instruction immediately when detecting a human face outside this available area. The determination manner described above may be combined with aforementioned white list or with aforementioned black list, so as to improve the flexibility of first condition.

The flow from step S4 to step S3' are describe in detail below. When determining that the second image M2 meets the second condition, the image recognition device 50 further determines whether the current first image M1 meets the first condition. The positive determination result means that at one suspicious person appears in the front side of the display device 100 and another suspicious person appears in the back side of the display device 100. Therefore, precedence must be given to conceal the displayed image to prevent the leakage of confidential information. Therefore, step S5 is performed for sending the first instruction. The negative determination means that the suspicious person appears only on the back side of the display device 100. Therefore, step S6 is performed for sending the second instruction, wherein the second instruction is different from the first instruction. Regarding a suspicious person appears in the front side of the display device 100 and another suspicious person appears in the back side of the display device 100, it should implement different protection mechanisms to the above conditions. For example, since the suspicious person cannot peep the content displayed by the display device 100 directly, the signal processor 70 only needs to generate a reminder message to notify the user. As a result, the method of automatically adjusting displayed image according to an embodiment of the present disclosure may reduce the frequency of obscuring the displayed image to avoid causing additional interference to the user.

The first image M1 may be referred to as a main detection frame, and the second image M2 obtained by the camera assembly 30 in a space other than the main detection frame may be referred to as a secondary detection frame. When the camera assembly 30 has a plurality of lenses, the lens facing in the first direction D1 is called the main lens, and the image captured by the main lens is called the main detection frame; the lens facing in a direction other than the first direction D1 is called the secondary lens, and the image captured by the secondary lens is called the secondary frame. The present disclosure uses the image recognition device 50 and the signal processor 70 to perform face recognition and image detection on the main detection frame for implementing the anti-peep function, and perform face recognition and image detection on the secondary detection frame for implementing a warning function to prevent peeping in advance.

In an embodiment, if the image recognition device 50 applies the black list mechanism on the second image M2 and generates the second instruction, the face image of the suspicious person U2 who is recorded in the black list may be stored in a cache. When detecting that a human face appears in the first image, the image recognition device 50 will access the face image characteristic value in the cache firstly, thereby increasing the speed of finding the matched face image in the black list. Moreover, after the warning issued by the signal processor 70 through the second instruction, the first instruction may be generated to conceal the displayed image immediately before the suspicious person U2 moves to the front side of the display device 100 to peep the screen, and thus the confidential information can be prevented from leakage. In other words, the method of automatically adjusting displayed image according to the present disclosure may determine whether to detect the same suspicious person within a continuous time by the setting of the second condition and the first condition, and perform corresponding anti-peeping mechanism accordingly.

In summary, the present disclosure proposed a display device capable of automatically adjusting displayed image and a method of automatically adjusting displayed image. The present disclosure uses a camera assembly to obtain a panoramic image around the display device. The present disclosure allows the user to set two conditions individually according to the main detection frame and the secondary detection frame. The present disclosure generates an instruction when detecting that the frames meet the customized condition, wherein the main detection frame and the secondary detection frame respectively correspond to different instructions. The display device can automatically conceal the displayed image when the main detection frame meets the first condition. The display device can generate a reminder message on the displayed image when the secondary detection frame meets the second condition. The camera assembly of the present disclosure can arrange a plurality of camera lenses around the display device to reduce the blind spot of the panoramic image, and thus to prevent a suspicious person from peeping at the confidential information displayed on the display device.

What is claimed is:

1. A display device capable of automatically adjusting displayed image comprising:
a display device including a shell and a display panel partially exposed from the shell, wherein the display panel faces in a first direction and the display device is configured to show a displayed image on the display panel according to a display signal;
a camera assembly disposed on the shell, wherein the camera assembly is configured to obtain a first image with a first visual angle and obtain a second image with a second visual angle, wherein the first direction is in a range of the first visual angle and is out of a range of the second visual angle;
an image recognition device disposed in the shell and electrically connecting to the camera assembly, wherein the image recognition device is configured to generate a first instruction when the first image meets a first condition and to generate a second instruction when the second image meets a second condition, and the first instruction is different from the second instruction; and
a signal processor electrically connecting to the display panel and the image recognition device, wherein the signal processor is configured to adjust the display signal to conceal the displayed image according to the first instruction and to adjust the display signal to generate a reminder message on the display panel according to the second instruction, wherein the signal processor is further configured to adjust the display signal according to the first instruction when receiving the first instruction and the second instruction simultaneously.

2. The display device capable of automatically adjusting displayed image of claim 1, wherein a sum of the first visual angle and the second visual angle is 360 degrees.

3. The display device capable of automatically adjusting displayed image of claim 1, wherein the camera assembly comprises a first camera device and a second camera device, the first camera device is configured to obtain the first image, and the second camera device is configured to obtain the second image.

4. The display device capable of automatically adjusting displayed image of claim 1 further comprising a storage device configured to store a white list, wherein the white list comprises at least one valid face image and the first condition is that the first image has a human face and the human face does not belong to said at least one valid face image.

5. The display device capable of automatically adjusting displayed image of claim 1 further comprising a storage device configured to store a black list, wherein the black list comprises at least one invalid face image and the first condition is that the first image has a human face and the human face belongs to one of said at least one invalid face image.

6. The display device capable of automatically adjusting displayed image of claim 1, wherein the camera assembly is further configured to obtain another first image, the first image and said another first image are obtained at a specified interval, and the first condition is that contents of the first image and said another first image are inconsistent.

7. The display device capable of automatically adjusting displayed image of claim 6, wherein the image recognition device is further configured to set an exception area in the first image, wherein the first condition is that the two consecutive first images obtained by the camera assembly are inconsistent outside the exception area, or the first condition is that the first image has a human face outside the exception area.

8. The display device capable of automatically adjusting displayed image of claim 1, wherein the second condition is that the second image has a human face.

9. A method of automatically adjusting displayed image comprising:
   displaying a displayed image according to a display signal by a display device facing in a first direction;
   after displaying the displayed image by the display device, obtaining a first image with a first visual angle and obtaining a second image with a second visual angle by a camera assembly, wherein the first direction is in a range of the first visual angle and is out of a range of the second visual angle;
   detecting the first image and the second image, sending a first instruction when the first image meets a first condition, and sending a second instruction when the second image meets a second condition by an image recognition device; and
   adjusting the display signal according to the first instruction by a signal processor to conceal the displayed image, or adjusting the display signal according to the second instruction to generate a reminder message on the display panel;
   wherein adjusting the display signal according to the first instruction by the signal processor comprises: adjusting the display signal according to the first instruction by the signal processor when receiving the first instruction and the second instruction simultaneously.

10. The method of automatically adjusting displayed image of claim 9, wherein a sum of the first visual angle and the second visual angle is 360 degrees.

11. The method of automatically adjusting displayed image of claim 9, wherein obtaining the first image and obtaining the second image by the camera assembly comprises: obtaining the first image by a first camera device and obtaining the second image by a second camera device.

12. The method of automatically adjusting displayed image of claim 9, before detecting the first image and the second image by the image recognition device, further comprising:
   storing a white list by a storage device, wherein the white list comprises at least one valid face image, and the first condition is that the first image has a human face and the human face does not belong to said at least one valid face image.

13. The method of automatically adjusting displayed image of claim 9, before detecting the first image and the second image by the image recognition device, further comprising:
   storing a black list by a storage device, wherein the black list comprises at least one invalid face image and the first condition is that the first image has a human face and the human face belongs to one of said at least one invalid face image.

14. The method of automatically adjusting displayed image of claim 9, after obtaining the first image by the camera assembly, further comprising:
   obtaining another first image by the camera assembly, wherein the first image and said another first image are obtained at a specified interval, and the first condition is that contents of the first image and said another first image are inconsistent.

15. The method of automatically adjusting displayed image of claim 14, before detecting the first image by the image recognition device, further comprising:
   setting an exception area to the first image by the image recognition device, wherein the first condition is that the two consecutive first images obtained by the camera assembly are inconsistent outside the exception area, or the first condition is that the first image has a human face outside the exception area.

16. The method of automatically adjusting displayed image of claim 9, wherein the second condition is that the second image has a human face.

* * * * *